United States Patent
Kanda et al.

(10) Patent No.: US 11,220,091 B2
(45) Date of Patent: *Jan. 11, 2022

(54) ROLL AND METHOD FOR PRODUCING ROLL

(71) Applicant: LINTEC Corporation, Tokyo (JP)

(72) Inventors: Toshimitsu Kanda, Tokyo (JP); Mayu Kaneko, Tokyo (JP)

(73) Assignee: LINTEC Corporation, Tokyo (JP)

( * ) Notice: Subject to any disclaimer, the term of this patent is extended or adjusted under 35 U.S.C. 154(b) by 160 days.

This patent is subject to a terminal disclaimer.

(21) Appl. No.: 16/484,960

(22) PCT Filed: Feb. 14, 2018

(86) PCT No.: PCT/JP2018/005061
§ 371 (c)(1),
(2) Date: Aug. 9, 2019

(87) PCT Pub. No.: WO2018/151145
PCT Pub. Date: Aug. 23, 2018

(65) Prior Publication Data
US 2020/0001580 A1 Jan. 2, 2020

(51) Int. Cl.
*B32B 27/08* (2006.01)
*C09J 7/29* (2018.01)
(Continued)

(52) U.S. Cl.
CPC ............... *B32B 27/08* (2013.01); *B32B 1/08* (2013.01); *B32B 7/12* (2013.01); *B32B 27/36* (2013.01);
(Continued)

(58) Field of Classification Search
None
See application file for complete search history.

(56) References Cited

U.S. PATENT DOCUMENTS

| 5,798,409 A | * | 8/1998 | Ho | C08G 18/10 |
| | | | | 524/506 |
| 2011/0045306 A1 | * | 2/2011 | Johnson | B29C 43/3697 |
| | | | | 428/423.1 |

(Continued)

FOREIGN PATENT DOCUMENTS

| JP | H10-17216 A | 1/1998 |
| JP | 2003-311934 A | 11/2003 |

(Continued)

OTHER PUBLICATIONS

Notification of Transmittal of Translation of the International Preliminary Report on Patentability dated Aug. 29, 2019, in connection with corresponding international Application No. PCT/JP2017/005598 (14 pgs., including machine-generated English translation).

(Continued)

*Primary Examiner* — Ramsey Zacharia
(74) *Attorney, Agent, or Firm* — Maier & Maier, PLLC (57) ABSTRACT

A roll and a method for producing a roll which are capable of effectively preventing tunneling are provided. A roll includes a core having a tubular shape and a laminate wound around the core. The laminate includes a process film, a surface coat layer, a substrate layer, an adhesive layer, and a release liner, in this order, in a laminating direction. The process film is formed from at least one member selected from polyethylene terephthalate (PET), polyolefins, and polyvinyl chloride (PVC). The surface coat layer is formed from a fluorine resin. The release liner is formed from polyethylene terephthalate (PET). The core is formed from an acrylonitrile-butadiene-styrene copolymer resin (ABS) or polypropylene (PP).

4 Claims, 4 Drawing Sheets

(51) Int. Cl.
*C09J 7/20* (2018.01)
*B32B 7/12* (2006.01)
*B32B 27/36* (2006.01)
*B32B 27/40* (2006.01)
*B65H 18/28* (2006.01)
*B65H 75/10* (2006.01)
*B32B 1/08* (2006.01)

(52) U.S. Cl.
CPC .............. *B32B 27/40* (2013.01); *B65H 18/28* (2013.01); *B65H 75/10* (2013.01); *C09J 7/201* (2018.01); *C09J 7/29* (2018.01); *B32B 2255/10* (2013.01); *B32B 2255/26* (2013.01); *B32B 2405/00* (2013.01); *C09J 2423/106* (2013.01); *C09J 2427/001* (2013.01); *C09J 2455/006* (2013.01); *C09J 2467/005* (2013.01)

(56) References Cited

U.S. PATENT DOCUMENTS

2013/0034677 A1 2/2013 Ujiie et al.
2017/0267480 A1* 9/2017 Sakamoto .............. B65H 23/18

FOREIGN PATENT DOCUMENTS

| | | | |
|---|---|---|---|
| JP | 2005-298094 | A | 10/2005 |
| JP | 2005-314507 | A | 11/2005 |
| JP | 2010-163577 | A | 7/2010 |
| JP | 2011-243613 | A | 12/2011 |
| JP | 3174515 | U | 2/2012 |
| JP | 2012-153514 | A | 8/2012 |
| JP | 2014097889 | A | 5/2014 |
| JP | 2014224220 | A | 12/2014 |

OTHER PUBLICATIONS

Korean Office Action dated Mar. 1, 2021, in connection with corresponding KR Application No. 10-2019-7022987 (7 pp., including machine-generated English translation).

Chinese Office Action dated Jan. 13, 2021, in connection with corresponding CN Application No. 201880011512.4 (10 pp., including machine-generated English translation).

International Search Report dated May 15, 2018 in corresponding International Application No. PCT/JP2018/005061; 4 pages.

* cited by examiner

ROLL AND METHOD FOR PRODUCING ROLL

FIELD

The present invention relates to a roll and a method for producing a roll.

BACKGROUND

Conventionally, like the adhesive sheet small-roll product described in Patent Literature 1, a roll in which a laminate obtained by laminating a release liner such as a release paper, an adhesive layer, and a substrate layer is wound around a tubular core is known.

When formed into a roll, an elongate laminate can be transported or stored in a compact form. However, when the environmental temperature or humidity changes during the transport or storage of the roll, delamination, which is so-called tunneling, may occur between the release liner and the adhesive layer.

SUMMARY

Technical Problem

As a result of examination by the present inventors, tunneling occurs due to poor conformability between a core and a laminate, which expand/shrink accompanying environmental temperature changes or humidity changes. It has turned out that tunneling is likely to occur particularly in a roll in which the laminate wound around the core has, in addition to the above release liner, adhesive layer, and substrate layer, a surface coat layer and a process film on the opposite side of the substrate layer from the release liner and the adhesive layer.

In order to improve the stain resistance and the like, for example, the present inventors have coated a substrate layer with a coating liquid containing a fluorine resin, followed by curing to form a surface coat layer. In addition, in order to prevent the formation of irregularities on the soft surface of the surface coat layer before sufficiently cured or the occurrence of blocking (the phenomenon that an uncured coating layer adheres to other substrate layers) during winding of the elongate substrate layer in the manufacturing process, the present inventors have disposed a process film on the surface coat layer.

As a result of disposing a process film on the surface coat layer, the formation of surface irregularities and blocking can be prevented. However, presumably, because the process film inhibits the laminate and the core from conforming to each other, tunneling is likely to occur. When tunneling occurs, the release liner may be distorted, and the resulting marks may remain on the surface of the adjacent adhesive layer, for example, therefore, this is undesirable.

Thus, the present inventors have conducted extensive research about the suppression of tunneling and, as a result, found that according to a core and a laminate each having a specific configuration, they conform well to each other upon expansion/shrinkage, whereby tunneling is suppressed. The present invention has thus been accomplished.

That is, the present invention has been made based on novel findings, and an object thereof is to provide a roll and a method for producing a roll, which are capable of effectively preventing tunneling.

The roll of the present invention for achieving the above object includes a core having a tubular shape and a laminate wound around the core. The laminate includes a process film, a surface coat layer, a substrate layer, an adhesive layer, and a release liner in this order in a laminating direction. The process film is formed from at least one member selected from the group consisting of polyethylene terephthalate (PET), polyolefins, and polyvinyl chloride (PVC). The surface coat layer is formed from a fluorine resin. The release liner is formed from polyethylene terephthalate (PET). The core is formed from an acrylonitrile-butadiene-styrene copolymer resin (ABS) or polypropylene (PP).

The method for producing a roll of the present invention for achieving the above object includes forming a coating layer of a composition containing a fluorine resin on one surface side of an elongate substrate that constitutes the substrate layer, disposing the process film on the coating layer, then winding the substrate together with the coating layer and the process film, and curing the coating layer as it is to form the surface coat layer. Subsequently, the method for producing a roll of the present invention includes unwinding the substrate together with the process film and the surface coat layer, providing the adhesive layer and the release liner on another surface side of the substrate to obtain the laminate, and winding the laminate around the core to produce the roll.

According to the roll and the method for producing a roll configured as above, the conformability between the core and the laminate is excellent. Thus, tunneling can be effectively prevented.

DETAILED DESCRIPTION

Hereinafter, embodiments of the present invention will be described with reference to the attached drawings. Incidentally, the scale ratio in the drawings is exaggerated for the convenience of explanation, and is different from the actual ratio.

Figure 1:
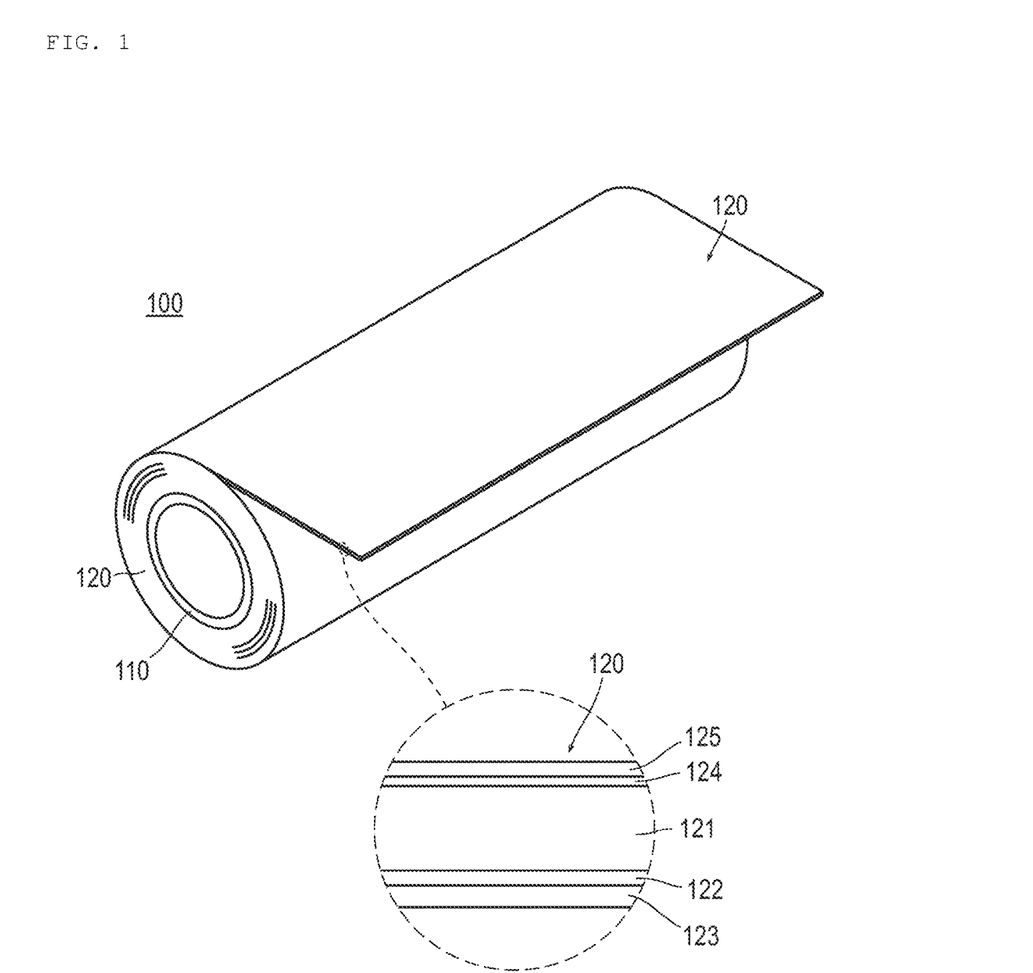
FIG. 1 A perspective view showing a roll of an embodiment.

As shown in FIG. 1, a roll 100 of an embodiment includes a core 110 and a laminate 120.

The core 110 has a tubular shape. Its inner diameter is 3 inches, 6 inches, or 11 inches, for example, and thickness is 4 mm or more and 12 mm or less, and preferably 5 mm or more and 6 mm or less, for example. However, the dimension is not limited thereto.

The forming material of the core 110 is an acrylonitrile-butadiene-styrene copolymer resin (ABS) or polypropylene (PP). The thermal expansion coefficient of the core 110 is preferably, but not limited to, $3 \times 10^{-6}$ mm/mm/° C. or more and $50 \times 10^{-6}$ mm/mm/° C. or less, and more preferably $20 \times 10^{-6}$ mm/mm/° C. or more and $50 \times 10^{-6}$ mm/mm/° C. or less.

The laminate 120 is elongate, but is wound around the core 110 and thus made compact. The entire length of the laminate 120 is, but not limited to, 15 m, for example. The laminate 120 is withdrawn from the roll 100 and cut to a suitable size or shape before use.

The laminate 120 is a paint protection film to be attached to a car body surface of an automobile to protect the coating layer, for example. However, the laminate 120 is not limited thereto, and may also be attached to an adherend other than car bodies, such as a signboard, to protect or decorate the surface, for example.

The laminate 120 includes a process film 125 (CAP sheet), a surface coat layer 124, a substrate layer 121, an adhesive layer 122, and a release liner 123 in this order in the laminating direction.

The substrate layer 121 is formed from a resin having flexibility. The forming material of the substrate layer 121 is preferably polyurethane (PU), but is not limited thereto, and may also be other resins such as polyvinyl chloride (PVC) and an ionomer, for example. Polyurethane (PU) has excellent flexibility, and thus is suitable for applications in which conformability to an adherend having a large number of curved surfaces is required, such as a paint protection film to be attached to a car body surface.

The thickness of the substrate layer 121 is, but not limited to, 100 μm or more and 300 μm or less, for example. By decreasing the thickness of the substrate layer 121, the flexibility can be enhanced, while by increasing the thickness, the scratch resistance can be raised.

The adhesive layer 122 (pressure-sensitive adhesive layer) is made from, for example, an acrylic-based adhesive, a rubber-based adhesive, a silicone-based adhesive, a polyurethane-based adhesive, a polyester-based adhesive, or the like, but the forming material of the adhesive layer 122 is not limited thereto. In addition, these adhesives may be used alone, and it is also possible to use two or more kinds together. The thickness of the adhesive layer 122 is, but not limited to, 10 μm or more and 100 μm or less, for example.

The release liner 123 is disposed on the surface of the adhesive layer 122, and is releasable. The thickness of the release liner 123 is, but not limited to, 30 μm or more and 150 μm or less, for example.

The release liner 123 is a resin film formed from polyethylene terephthalate (PET). When the release liner 123 is formed from polyethylene terephthalate (PET), the resulting release liner 123 is relatively hard and tenacious and thus is easy to take off. In addition, the cuttability of the laminate 120 is also excellent. In addition, when the release liner 123 is formed from polyethylene terephthalate (PET), the resulting release liner 123 has relatively high surface smoothness. Accordingly, the smoothness of the adhesive layer 122 adjacent to the release liner 123 is also excellent. When the surface of the adhesive layer 122 is smooth and has reduced roughness, even in the case of a transparent product, such as a paint protection film, for example, the external appearance is unlikely to be deteriorated. A release agent, such as silicone, may be applied to the surface of the release liner 123.

The peel force required to peel off the release liner 123 is not particularly limited, but it is preferable that the operator can easily peel off by hand. The laminate 120 is attached to an adherend in such a state that the release liner 123 has been peeled off and the adhesive layer 122 is exposed.

The surface coat layer 124 is formed from a fluorine resin and has stain resistance. The thickness of the surface coat layer 124 is, but not particularly limited to, 0.5 to 50 μm, for example.

The fluorine resin to serve as a forming material of the surface coat layer 124 is preferably in a crosslinked form. More preferably, the forming material of the surface coat layer 124 is a cured composition containing at least one crosslinking agent selected from isocyanate-based crosslinking agents and epoxy-based crosslinking agents and a fluorine resin having a functional group reactive with the crosslinking agent. Such a surface coat layer 124 has excellent ductility.

Examples of isocyanate-based crosslinking agents include diisocyanate compounds including aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,2,4-trimethylhexamethylene diisocyanate, 2,4,4-trimethylhexamethylene diisocyanate, 2,6-diisocyanate methyl caproate, lysine diisocyanate, lysine ester triisocyanate, 1,6,11-undecanetriisocyanate, 1,3,6-hexamethylene triisocyanate, and decamethylene diisocyanate; aromatic diisocyanates, such as tolylene diisocyanate, xylenediisocyanate, and diphenylmethane diisocyanate; and alicyclic diisocyanates, such as isophorone diisocyanate; adducts of diisocyanate compounds and polyol compounds such as trimethylolpropane; biurets and isocyanurates of diisocyanate compounds; an urethane prepolymer; and the like.

Examples of epoxy-based crosslinking agents include epoxy compounds such as N,N,N',N'-tetraglycidyl-m-xylenediamine, N,N,N',N'-tetraglycidyl-46,4-diaminodiphenylmethane, 1,3-bis(N,N-diglycidylaminomethyl)cyclohexane, 1,3-bis(N,N-diglycidylaminomethyl) toluene, and the like. Among them, because ductility is more ensured, it is more preferable that the crosslinking agent is an isocyanate-based crosslinking agent. The crosslinking agents may be used alone, and it is also possible to use two or more kinds together.

Examples of functional groups in the fluorine resin having a functional group reactive with the crosslinking agent include a hydroxy group, a carboxyl group, an amino group, a glycidyl group, a cyano group, a silyl group, a silanate group, and the like. In terms of crosslinkability, the functional group is preferably a hydroxy group. At this time, the hydroxy value of the fluorine resin having a functional group reactive with the crosslinking agent is preferably 5 to 200 mg KOH/g, and more preferably 30 to 180 mg KOH/g. When the hydroxy value is within such a range, the crosslinking reactivity and the solubility in the solvent are excellent.

Examples of fluorine resins having a functional group reactive with the crosslinking agent include silicon-containing fluorine resins described in JP 2001-163927A, JP 2001-206918 A, JP 2004-115792 A, and the like; fluorine resins described in JP 2011-121359 A and the like; and the like.

The fluorine resin having a functional group reactive with the crosslinking agent may be a commercially available product. Examples of commercially available products include Fclear series manufactured by Kanto Denka Kogyo Co., Ltd. (Fclear KD3100, Fclear KD270), Obbligato SS0062 manufactured by AGC Coat-Tech Co., Ltd., and the like.

At the time of forming the surface coat layer 124, the fluorine resin and the crosslinking agent are preferably contained in such a content ratio that the functional group that can contribute to crosslinking in the crosslinking agent (e.g., isocyanate group): the functional group that reacts with the crosslinking agent in the fluorine resin (e.g., hydroxy group)=5:1 to 1:10.

The process film 125 is disposed on the surface of the surface coat layer 124, and serves to maintain the surface of the surface coat layer 124 before curing smooth and also prevent blocking.

The process film 125 is formed from polyethylene terephthalate (PET), for example. However, the material is not limited thereto, and the process film 125 is formed from at least one member selected from the group consisting of polyethylene terephthalate (PET), polyolefins, and polyvinyl chloride (PVC). Examples of polyolefins include, but are not limited to, polyethylene (PE), polypropylene (PP), polybutene (PB), polybutadiene (PBD), polymethylpentene (PMP), and the like. The polyolefin may be a drawn polyolefin or may also be an undrawn polyolefin. The thickness of the process film 125 is, but not particularly limited to, 5 to 200 µm, for example.

When the process film 125 is formed from polyethylene terephthalate (PET), for example, the smoothness is excellent. As a result, the surface of the adjacent surface coat layer 124 also has excellent smoothness. Thus, for example, in a transparent product such as a paint protection film, the deterioration of external appearance due to the visual recognition of surface roughness can be prevented.

Meanwhile, when the process film 125 is formed from a polyolefin or polyvinyl chloride (PVC), for example, the flexibility is relatively high. As a result, in the case where the core 110 and the laminate 120 expand/shrink accompanying environmental temperature changes and the like, conformation to such deformation is further facilitated.

Of both surfaces of the process film 125, on the surface on the opposite side from the surface coat layer 124, a release agent such as silicone may be applied. As a result, the overlapping layers of the laminate 120 wound around the core 110 can be easily peeled from each other.

Next, a method for producing the roll 100 will be described.

The roll 100 is prepared, for example, by providing a surface coat layer 124 and a process film 125 on one surface side of a substrate layer 121, then providing an adhesive layer 122 and a release liner 123 on another surface side of the substrate layer 121 to form a laminate 120, and winding the laminate 120 around a core 110. However, the preparation is not limited thereto.

The surface coat layer 124 is formed by curing a coating layer of a composition containing at least one crosslinking agent selected from isocyanate-based crosslinking agents and epoxy-based crosslinking agents (hereinafter sometimes simply referred to as crosslinking agent) and a fluorine resin having a functional group reactive with the crosslinking agent (hereinafter sometimes simply referred to as fluorine resin) as described above.

Such a coating layer is formed based on a coating liquid applied to one surface side of the elongate substrate that constitutes the substrate layer 121. The coating liquid is a solution having a fluorine resin and a crosslinking agent dissolved in a solvent.

Specific examples of solvents contained in the coating liquid include ester-based solvents such as ethyl acetate and butyl acetate, ketone-based solvents such as methyl ethyl ketone and methyl isobutyl ketone, alcoholic solvents such as ethanol and isopropyl alcohol, aromatic solvents such as benzene, toluene, and xylene, aliphatic saturated hydrocarbon-based solvents such as hexane, isohexane, heptane, octane, and isooctane, aliphatic solvents such as cyclohexane, methylcyclohexane, and dimethylcyclohexane, chlorine-based solvents such as trichloroethylene, chloroform, and m-xylene hexachloride, ether-based solvents such as acetone, diethyl ether, diisopropyl ether, and tetrahydrofuran, fluorine-based solvents such as methyl perfluorobutyl ether and ethyl perfluorobutyl ether, silicone-based solvents such as hexamethyldisiloxane, hexamethylcyclotrisiloxane, and heptamethyltrisiloxane, and the like. Solvents may be used alone, and it is also possible to use two or more kinds together.

The coating method for the coating liquid is not particularly limited. For example, coating can be performed using a known coating device, such as a roll coater, a knife coater, an air knife coater, a bar coater, a blade coater, a slot die coater, a lip coater, or a gravure coater.

After coating, the solvent is removed from the coating liquid by a drying treatment, whereby a coating layer is formed. The drying conditions at this time are not particularly limited. In terms of solvent removal, drying at 60 to 150° C. is preferable. In addition, the drying time may be suitably set up to the time that completes drying, and may be about 30 seconds to 3 minutes, for example.

In addition, a crosslinking promotor may also be used in the coating liquid. Examples of crosslinking promotors include triethylamine, N,N-dimethylcyclohexylamine, tetramethylethylenediamine, triamine, cyclic amine, dimethylethanolamine, and like alcohol amines, ether amine, and, as metal catalysts potassium acetate, potassium 2-ethylhexanote, calcium acetate, lead octylate, dibutyltin dilaurate, dioctyltin dilaurate, tin octylate, bismuth neodecanoate, bismuth oxycarbonate, bismuth 2-ethylhexanoate, zinc octylate, zinc neodecanoate, phosphine, phospholine, and the like. These crosslinking promotors may be used alone, and it is also possible to use two or more kinds together.

After formation of a coating layer, a process film 125 is disposed thereon. It takes time to cure a coating layer. Therefore, in consideration of production efficiency, particularly in the case of large-scale production, before curing is fully completed, the substrate is wound together with the coating layer and the process film 125 thereon, and the resulting roll is further allowed to stand in such a state for one week or so, for example, whereby the curing of the coating layer is completed.

When winding is performed in the state where the coating layer is not fully cured, the coating layer may adhere to the substrate. However, in this embodiment, because the process film 125 is disposed on the coating layer, the coating layer can be prevented from adhering to the substrate. In addition, when the surface of the process film 125 is smooth, the formation of irregularities on the surface of the coating layer can be prevented.

After the curing of the coating layer is completed, and the surface coat layer 124 is formed, the substrate is unwound together with the surface coat layer 124 and the process film 125. Then, on the other surface of the substrate opposite from the surface on which the surface coat layer 124 and the process film 125 are disposed, an adhesive layer 122 and a release liner 123 are provided in a usual manner.

How they are provided is not particularly limited. However, for example, it is possible that an adhesive is applied to a release liner 123 to form an adhesive layer 122, and the release liner 123 is attached to the other surface of the substrate through the adhesive layer 122, thereby providing the adhesive layer 122 and the release liner 123. Alternatively, it is also possible that an adhesive is applied to the other surface of the substrate and dried to form an adhesive layer 122, and then a release liner 123 may be attached thereto.

Next, the working effect of this embodiment will be described in contrast with a comparison.

Figure 2:
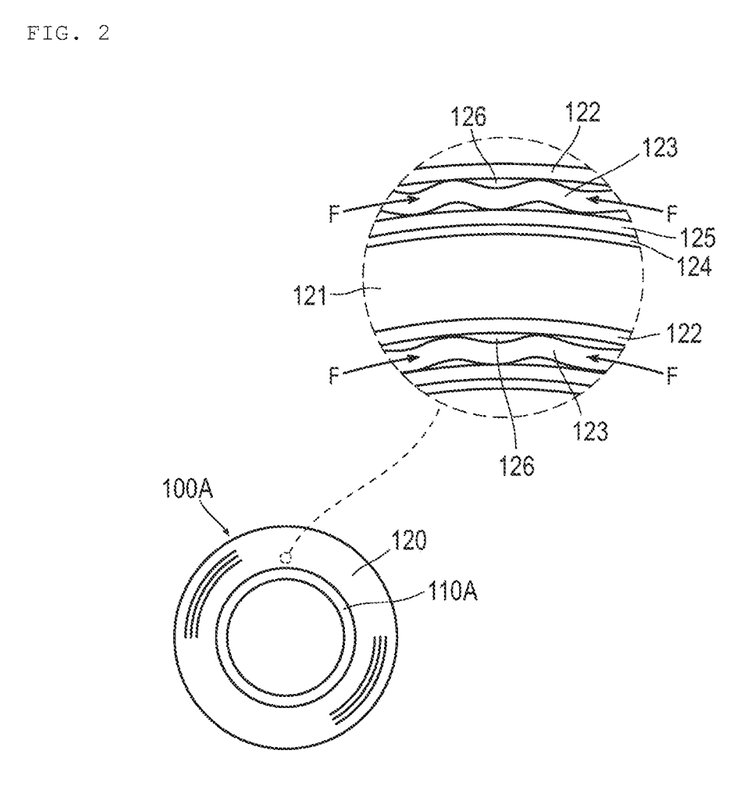
FIG. 2 A diagram showing a comparison where tunneling has occurred.

Like a roll 100A of a comparison shown in FIG. 2, in the case where the core 110A is different from this embodiment, upon expansion/shrinkage accompanying environmental temperature changes or humidity changes, the core 110A and the laminate 120 may not conform well to each other. In particular, in the laminate 120 containing the process film 125, the process film 125 is likely to inhibit the core 110A and the laminate 120 from conforming to each other.

For example, in the case where the core 110A is formed from a paper tube, the core 110A, which is likely to absorb/release moisture, is relatively significantly deformed accompanying environmental humidity changes, and the core 110A and the laminate 120 may not conform well to each other. In addition, even in the case where the core 110A is formed from a resin, for example, when the difference in thermal expansion between the core 110A and the laminate 120 upon environmental temperature changes is large, the core 110A and the laminate 120 may not conform well to each other.

Then, when the core 110A and the laminate 120 do not conform well to each other, tunneling 126 may occur between the release liner 123 and the adhesive layer 122. As a result of examination by the present inventors, the reason therefore is presumably as follows: as a result of the core 110A and the laminate 120 not conforming well to each other upon changes in the environmental temperature or humidity, the compressive stress F in the circumferential direction acts on the release liner 123, whereby the release liner 123 is distorted in a wave-like fashion.

When the release liner 123 is distorted as in the roll 100A of the comparison, the surface of the adhesive layer 122 is deformed according to distortion, and marks thereof may remain on the surface of the adhesive layer 122. In the case where such marks remain in a transparent product like a protection film, for example, when the film is attached to an adherend such as a car body, the marks are visually recognized as a striped pattern, for example, deteriorating the external appearance; therefore, this is undesirable.

Meanwhile, the roll 100 of this embodiment has been invented based on the results of the present inventors' extensive research about the configurations of a core 110 and a laminate 120 having excellent conformability. Therefore, even though the laminate 120 contains a release liner 123 formed from polyethylene terephthalate (PET) and a process film 125 formed from at least one member selected from the group consisting of polyethylene terephthalate (PET), polyolefins and polyvinyl chloride (PVC), which may a factor that inhibits the core 110 and the laminate 120 from conforming to each other, because the laminate 120 is wound around a core 110 formed from an acrylonitrile-butadiene-styrene copolymer resin (ABS) or polypropylene (PP), the conformability between the core 110 and the laminate 120 is excellent. Therefore, according to this embodiment, tunneling can be effectively prevented.

The forming material of the surface coat layer 124 is a cured composition containing at least one crosslinking agent selected from isocyanate-based crosslinking agents and epoxy-based crosslinking agents and a fluorine resin having a functional group reactive with the crosslinking agent, and the surface coat layer 124 has excellent ductility. Therefore, the core 110 and the laminate 120 are less likely to be inhibited from conforming to each other, and tunneling is more effectively suppressed.

In addition, when the thermal expansion coefficient of the core 110 is $3 \times 10^{-6}$ mm/mm/° C. or more and $50 \times 10^{-6}$ mm/mm/° C. or less, excessive expansion/shrinkage of the core 110 upon environmental temperature changes is suppressed. Accordingly, the occurrence of tunneling accompanying environmental temperature changes can be prevented more effectively.

Here, the thermal expansion coefficient is expressed by the following formula (1). In formula (1), $\alpha$ is a thermal expansion coefficient, $r_{20° C.}$ is the radius (half of the outer diameter) of the core 110 at an environmental temperature of 20° C.

[Mathematical Formula 1]

$$\alpha = \frac{1}{r_{20° C.}} \frac{dr}{dt} \qquad \text{Formula (1)}$$

Figure 3:
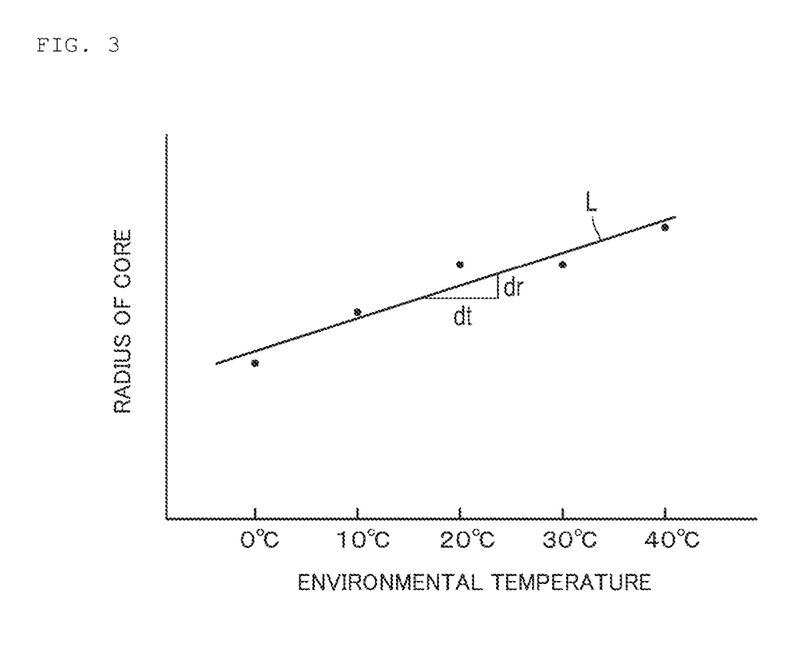
FIG. 3 A graph showing environmental temperature changes and the resulting changes in the radius of the core.

In addition, as shown in FIG. 3, dr/dt in the above formula (1) can be determined as the inclination of the straight line L obtained by measuring the radius of each core 110 when the environmental temperature is changed by 10° C. from 0° C. to 40° C.

Examples and Comparative Examples

The present inventors actually produced rolls of Examples 1 and 2 each having the configuration in accordance with the roll 100 of the above embodiment, and also produced rolls of Comparative Examples 1 and 2 for comparison, each having a core different therefrom. The temperature and humidity of the environment in which each roll was stored were changed, thereby examining the suppressing effect on tunneling.

The rolls of Examples 1 and 2 and Comparative Examples 1 and 2 are common in the configuration of the laminate wound around the core, but are different in the material of the core.

Changes in the temperature and humidity of the environment in which each roll was stored are as follows: <1> Ordinary-temperature environment (23° C., 50% RH)→change the environment over two days→<2> Low-temperature dry environment (5° C., about 2% RH)→change the environment over two days→<3> High-temperature high-humidity environment (35° C., 80% RH)→change the environment over two days→<4> Low-temperature dry environment (5° C., about 2% RH). After these environment changes <1> to <4>, the present inventors observed each roll, and evaluated the suppressing effect on tunneling.

In Table 1 below, the configurations of Examples 1 and 2 and Comparative Examples 1 and 2, as well as the evaluation results about the suppressing effect on tunneling, are collectively shown.

In the column of the tunneling suppressing effect in Table 1, ⊙ indicates that the suppressing effect on tunneling is particularly excellent, ○ indicates that the suppressing effect on tunneling is excellent, Δ indicates that the suppressing effect on tunneling is low, and X indicates that the suppressing effect on tunneling is particularly low.

TABLE 1

|  | Example 1 | Example 2 | Comparative Example 1 | Comparative Example 2 |
|---|---|---|---|---|
| Tunneling suppressing effect | ⊙ | ○ | X | Δ |
| Core (Inner diameter: about 3 inches, Thickness: 5 mm) | ABS | PP | Paper tube | PE |

TABLE 1-continued

|  | | Example 1 | Example 2 | Comparative Example 1 | Comparative Example 2 |
|---|---|---|---|---|---|
| Laminate | Process film | PET (Thickness: 50 μm) | | | |
|  | Surface coat layer | Fluorine resin (Thickness: 7 μm) | | | |
|  | Substrate layer | Polyurethane (Thickness: 150 μm) | | | |
|  | Adhesive layer | Pressure-sensitive adhesive (Thickness: 45 μm) | | | |
|  | Release liner | PET (Thickness: 50 μm) | | | |

Figure 4:
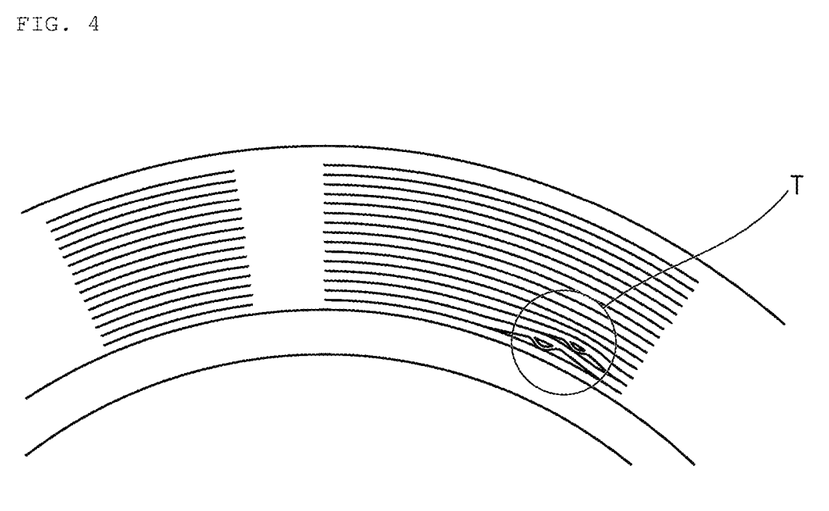
FIG. 4 A picture showing a roll of a comparative example where tunneling has occurred.

As shown by the results of Comparative Example 1 in Table 1 and the reference sign T in FIG. 4, in the roll of the Comparative Example 1 having a core made of a paper tube, tunneling clearly occurred. In addition, also in Comparative Example 2 having a core made of polyethylene (PE), albeit slightly, tunneling occurred. Presumably, such tunneling is partly because of the poor conformability between the core and the surrounding laminate upon expansion/shrinkage accompanying environmental temperature changes and humidity changes.

Figure 5:
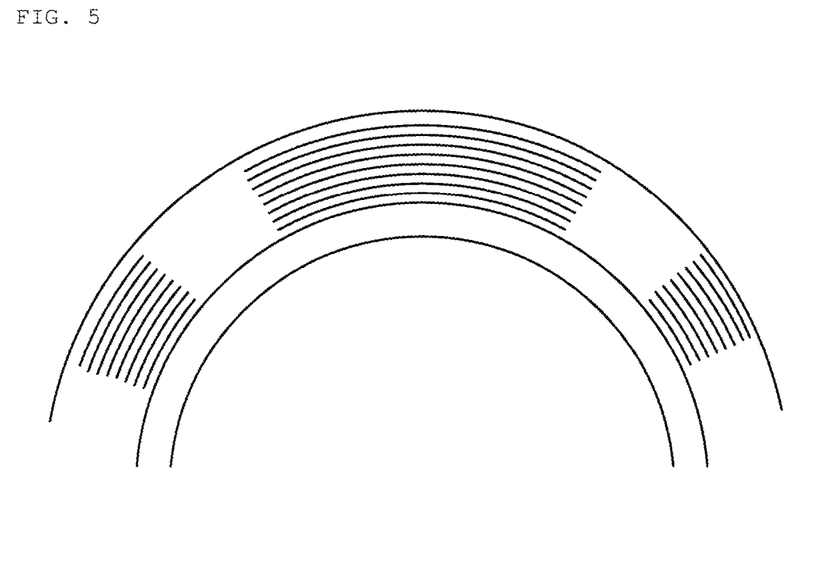
FIG. 5 A picture showing a roll of an example where tunneling is suppressed.

Meanwhile, as shown by the results of Example 1 in Table 1 and FIG. 5, in Example 1 having a core made of an acrylonitrile-butadiene-styrene copolymer resin (ABS), tunneling was particularly effectively suppressed. In addition, as shown by the results of Example 2 in Table 1, also in Example 2 having a core made of polypropylene (PP), the suppressing effect on tunneling was excellent.

These results show that when a roll is produced in accordance with the above embodiment, even in the case where expansion/shrinkage occurs accompanying environmental temperature changes and humidity changes, the core and the surrounding laminate conform well to each other, and tunneling can be effectively suppressed.

The present invention is not limited to the embodiment and examples described above, and various modifications can be made within the scope of claims.

For example, although the laminate 120 is wound in such a manner that the release liner 123 is disposed on the core 110 side in the embodiment and examples described above, the present invention encompasses a mode in which the laminate is wound inside out.

In addition, although the hardness of the core is not particularly limited either, when the deformation of the core increases due to the winding pressure from the laminate to be wound, tunneling may be resulted. Accordingly, the core preferably has a certain degree of hardness. The hardness of a core is expressed by the following formula (2), for example.

[Mathematical Formula 2]

$$E = \frac{E_m}{\frac{\left(\frac{r}{r-t}\right)^2 + 1}{\left(\frac{r}{r-t}\right)^2 - 1} - v} \quad \text{Formula (2)}$$

In formula (2), E represents the hardness of a core, $E_m$ is the Young's modulus of the forming material of the core itself, and $v$ is a Poisson's ratio. $v$ is 0.3 to 0.4, for example. In addition, in equation (2), r is the radius of the core, and t is the thickness of the core.

The hardness of the core is 0.2 GPa or more and 6 GPa or less, for example, and preferably 0.4 GPa or more and 0.8 GPa or less.

This application is based on International Application No. PCT/JP2017/005598 filed on Feb. 15, 2017, the contents of which are entirely incorporated herein by reference.

The invention claimed is:

1. A roll comprising:
   a core having a tubular shape; and
   a laminate wound around the core,
   wherein the laminate includes a process film, a surface coat layer, a substrate layer, an adhesive layer, and a release liner, in this order, in a laminating direction,
   the process film is formed from at least one member selected from the group consisting of polyethylene terephthalate (PET), polyolefins, and polyvinyl chloride (PVC),
   the surface coat layer is formed from a fluorine resin,
   the release liner is in directed contact with a surface of the adhesive, and is formed from polyethylene terephthalate (PET), and
   the core is formed from an acrylonitrile-butadiene-styrene copolymer resin (ABS) or polypropylene (PP).

2. The roll according to claim 1, wherein a forming material of the surface coat layer is a cured composition containing at least one crosslinking agent selected from isocyanate-based crosslinking agents and epoxy-based crosslinking agents and a fluorine resin having a functional group reactive with the crosslinking agent.

3. The roll according to claim 1, wherein a thermal expansion coefficient of the core is $3 \times 10^{-6}$ mm/mm/° C. or more and $50 \times 10^{-6}$ mm/mm/° C. or less.

4. A method for producing a roll, comprising:
   forming a coating layer of a composition containing a fluorine resin on one surface side of an elongate substrate that forms the substrate layer, disposing the process film on the coating layer, then winding the substrate together with the coating layer and the process film, curing the coating layer as it is to form the surface coat layer, and
   subsequently unwinding the substrate together with the process film and the surface coat layer, providing the adhesive layer and the release liner on another surface side of the substrate to obtain the laminate, and winding the laminate around the core to produce the roll according to claim 1.

* * * * *